Jan. 8, 1952 V. B. MADSEN ET AL 2,581,803
SIGNAL LANTERN
Filed Nov. 12, 1947 2 SHEETS—SHEET 1
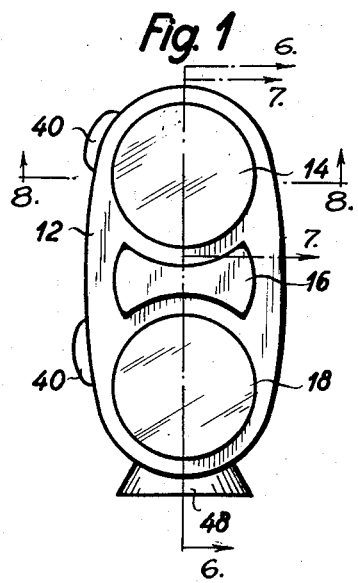
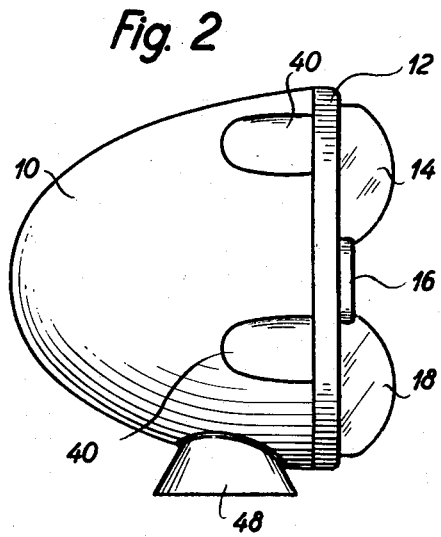
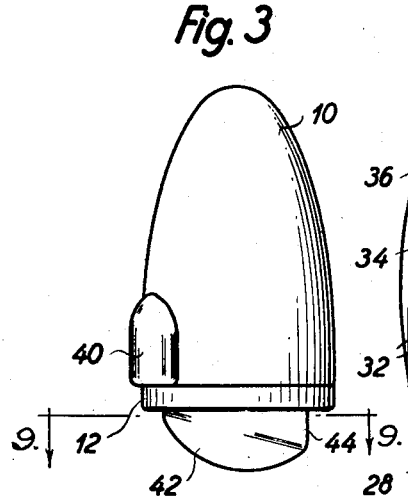
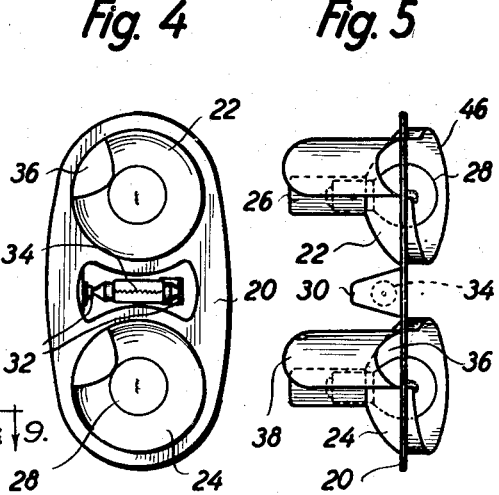
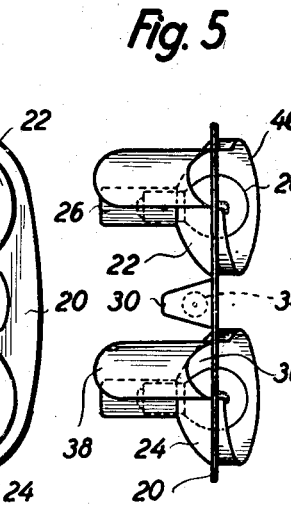
Inventor
VALDEMAR BECKER MADSEN AND
ANNA KIRSTINE CATHRINE ADELE BECKER MADSEN,
By E. F. Wenderoth
Attorney Jan. 8, 1952 V. B. MADSEN ET AL 2,581,803
SIGNAL LANTERN Filed Nov. 12, 1947 2 SHEETS—SHEET 2

INVENTORS
VALDEMAR BECKER MADSEN AND
ANNA KIRSTINE CATHRINE ADELE BECKER MADSEN,
BY Wenderoth, Lind + Ponack
ATTORNEYS Patented Jan. 8, 1952

2,581,803

UNITED STATES PATENT OFFICE 2,581,803

SIGNAL LANTERN

Valdemar Becker Madsen and Anna Kirstine Cathrine Adele Becker Madsen, Holte, Denmark Application November 12, 1947, Serial No. 785,396
In Denmark May 24, 1947

2 Claims. (Cl. 177—329)

Our invention relates to a signal lantern, particularly for vehicles and other means of conveyance.

The object of the invention is to provide such a signal lantern comprising a number of illuminants of different colours and in which one or more of the said illuminants are visible both from in front and from the side of the lantern.

A further object of the invention is to provide a signal lantern comprising a number of illuminants of different colours, and in which one or more of the said illuminants are visible both from in front and from the side of the lantern, whereas at least one of the said illuminants is visible substantially from in front of the lantern, only.

A further object of the invention is to provide a signal lantern of the afore-mentioned kind in which one or more comparatively large, illuminous, coloured surfaces are obtained at the side of the lantern.

A further object of the invention is to provide a signal lantern which when lighted can be seen from a long distance.

A further object of the invention is to provide a signal lantern in which signalling by day is not disturbed by sunlight.

Figure 6:
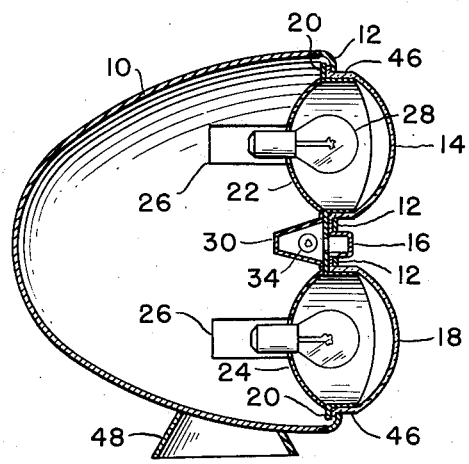
Figure 7:
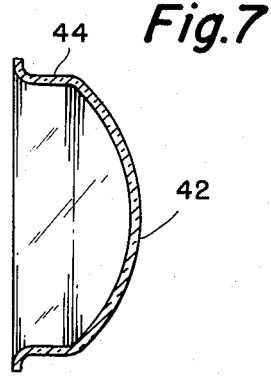
Figure 8:
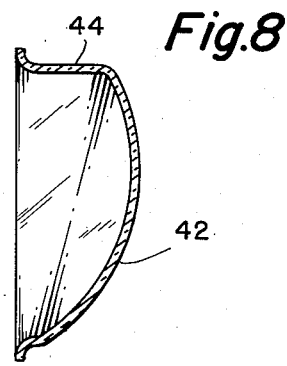
Figure 10:
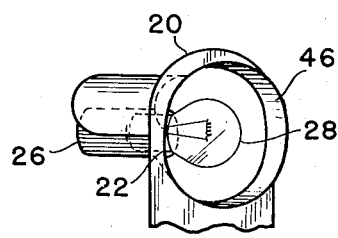
Figure 9:
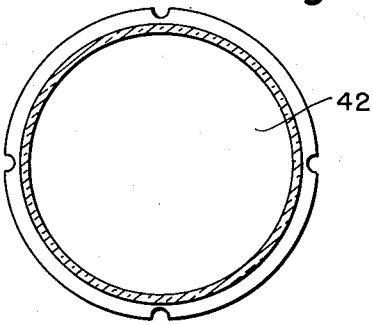

Further objects of the invention will be apparent from the following description in which reference is made to the drawings in which Figures 1, 2 and 3 show an embodiment of a lantern according to the invention in a front view, a side view and a plan view, respectively, Figures 4 and 5 show the reflector plate and lamps in the lantern in a front view and in a side view, respectively, Figure 6 is a sectional view taken on the line 6—6 of Figure 1, Figure 7 is a sectional view of the glass taken on the line 7—7 of Figure 1, Figure 8 is a sectional view of the glass taken on the line 8—8 of Figure 1, Figure 9 is a sectional view of the glass taken on the line 9—9 of Figure 3, and Figure 10 is an isometric view of a single illuminant of the invention.

The embodiment of the lantern according to the invention shown consists of a lengthwise flattened parabolic casing 10 with an open front where it is covered by a front plate 12 holding three glasses 14, 16 and 18 in position. The glasses 14 and 18 are arched and—when seen from the front—of circular section, and the glass 16 is oblong and placed at a central position between the two first-mentioned glasses. The longitudinal sides of the glass 16 are, as will be seen from Fig. 1, concave and curved in accordance with the curvature of the circular glasses 14 and 18.

Behind the front plate 12, which by means of a bead engages a groove on the lantern casing 10, is provided a plate 20, Figs. 4 and 5, into which are forced reflectors 22 and 24 of a parabolic form opposite the glasses 14 and 18, respectively. The top of the said reflectors is provided with a neck 26 forming a socket for an electric bulb 28. At a central position between the reflectors 22 and 24 a third reflector 30 is forced into the plate 20, the said reflector being oblong in the transverse direction of the plate and of substantially paraboliform cross section. This reflector is suitably provided with sockets 32 for a tubular lamp 34.

The side wall of each reflector 22 and 24 is provided with a recess 36 located slightly above a horizontal plane through the axis of the reflector. From the said recess a reflecting surface 38 extends to the rear, see Fig. 5, projecting into the casing 10 close to the side wall of same. Opposite the said surface 38 the lantern casing is provided with a recess fitted with a slightly curved glass 40.

The glasses 14, 16 and 18 are of different colours, the glass 14, for instance, being red, the glass 16 yellow and the glass 18 green. The coloured lights produced by switching on the appertaining lamps 28 may serve to signal changes in direction of movement, whereas the yellow colour produced by the glass 16 serves to indicate changes of speed.

The glasses 14 and 18 may, as is best seen in Fig. 3, consist of a part in the form of a spherical calotte 42 forming an angle with the axis of the corresponding reflector which is pressed integral with an obliquely cut off cylinder wall 44, the base of which is level with the front of the lantern and has a bead projecting outwards by means of which the glass is held in position by the front plate 12. The interior highest part of the cylinder wall is covered by a reflecting foil 46 which may be fastened to the plate 20, see Fig. 5, or be placed loosely in the cylinder wall 44 in such a manner that it covers the highest part of same, reflecting the light towards the recess 36. The foil 46 may have corrugations in the direction of the axis of the appertaining reflector.

The glasses 40 being of a considerable extent, the amount of laterally emitted light is substantial so that the upper and the lower illuminants are plainly visible, not only from in front, but from the side too.

The amount of laterally emitted light is further increased owing to the oblique shape of the appertaining glasses.

The lantern can be mounted on the vehicle or other means of conveyance by means of a support 48.

The term "glass" shall not be a limitation of the material used, but means here a transparent cover, preferably such as will allow the beams of light to pass without changing their direction. The said cover may conveniently consist of a transparent, artificial material, e. g. plastic.

It should be noted that the lighted lantern can be seen from a long distance and that signalling by day is not disturbed by the sunlight, which i. e. is due to the special shape of the glasses 14 and 18.

Having thus fully described our invention we claim as new and desire to secure by Letter Patent:

1. A signal lantern comprising a lantern casing and an illuminant, said illuminant comprising a lamp, a reflector in which said lamp is placed, an arched transparent cover in the shape of a spherical calotte disposed at an angle to the axis of the said reflector and located on an obliquely cut off cylinder wall pressed integral with the said calotte, said reflector and said lamp being closely behind said cover, the base of said cylinder being level with the front of the lantern, the side wall of said reflector being provided with a recess opposite the highest part of said cylinder wall, a reflecting surface extending from the said recess towards the rear of the lantern casing and facing outwards towards the side of the lantern, a further transparent cover being fitted in the side wall of the lantern casing, opposite the said reflecting surface.

2. A signal lantern according to claim 1, and wherein the interior of the highest part of said cylinder wall is covered by a reflecting foil adapted to reflect the light of the lamp to the same side as said reflecting surface.

VALDEMAR BECKER MADSEN.
ANNA KIRSTINE CATHRINE
ADELE BECKER MADSEN.

REFERENCES CITED

The following references are of record in the file of this patent:

UNITED STATES PATENTS

| Number | Name | Date |
|---|---|---|
| D. 57,834 | Gordon | May 10, 1921 |
| 1,130,393 | Giese et al. | Mar. 2, 1915 |
| 1,279,159 | Riggs | Sept. 17, 1918 |
| 1,380,155 | McMahon | May 31, 1921 |
| 1,552,188 | Atkinson | Sept. 1, 1925 |
| 1,735,403 | MacCarthy | Nov. 12, 1929 |
| 1,969,116 | Bobroff | Aug. 7, 1934 |
| 2,005,714 | Bobroff | June 18, 1935 |